United States Patent

Eicher

[15] 3,648,070
[45] Mar. 7, 1972

[54] STRUCTURE FOR AND METHOD OF VOLTAGE DIP COUNTING

[72] Inventor: Dennis R. Eicher, Muscatine, Iowa

[73] Assignee: The Detroit Edison Company, Detroit, Mich.

[22] Filed: Nov. 20, 1969

[21] Appl. No.: 878,361

[52] U.S. Cl. ............................ 307/235, 307/301, 307/310, 328/146, 324/99 D, 307/305
[51] Int. Cl. ......................................................... H03k 5/20
[58] Field of Search .............................. 307/235, 301, 310; 328/146–148, 116; 324/99 D, 103 D, 103, 99, 77 A

[56] References Cited

UNITED STATES PATENTS

| | | | |
|---|---|---|---|
| 2,486,890 | 11/1949 | Stanmyre | 324/103 |
| 2,541,039 | 2/1951 | Cole | 324/103 P |
| 2,817,815 | 12/1957 | Evans | 324/77 A |
| 2,972,126 | 2/1961 | Hecox et al. | 324/99 D |
| 3,192,466 | 6/1965 | Sylvan et al. | 307/262 |
| 3,317,747 | 5/1967 | Bryant | 328/116 |
| 3,126,491 | 3/1964 | Rockwell | 307/293 |
| 3,414,739 | 12/1968 | Paidosh | 307/310 |
| 3,439,237 | 4/1969 | Sylvan | 307/310 |

OTHER PUBLICATIONS

General Electric SCR Manual 4th Edition pages 161 & 162 Mar. 20, 1967

Primary Examiner—Donald D. Forrer
Assistant Examiner—R. E. Hart
Attorney—Whittemore, Hulbert & Belknap

[57] ABSTRACT

The number of voltage dips of an alternating source of electrical energy of a plurality of separate magnitude are counted in accordance with the method of the invention with the structure of the invention. A reference voltage is produced from the source of electrical energy of substantially the root means square voltage of the source of electrical energy and the reference voltage is compared with each single cycle voltage in separate comparison circuits for each of a number of selected voltage dip magnitudes to provide output signals each time the single cycle voltage dips below the selected magnitudes of the separate comparison circuits and the output signals of each comparison circuit is counted separately. The comparison is accomplished in unijunction transistors which may be compensated for temperature change while the counting is accomplished by counters energized through silicon-controlled rectifiers in series with the counters.

7 Claims, 1 Drawing Figure

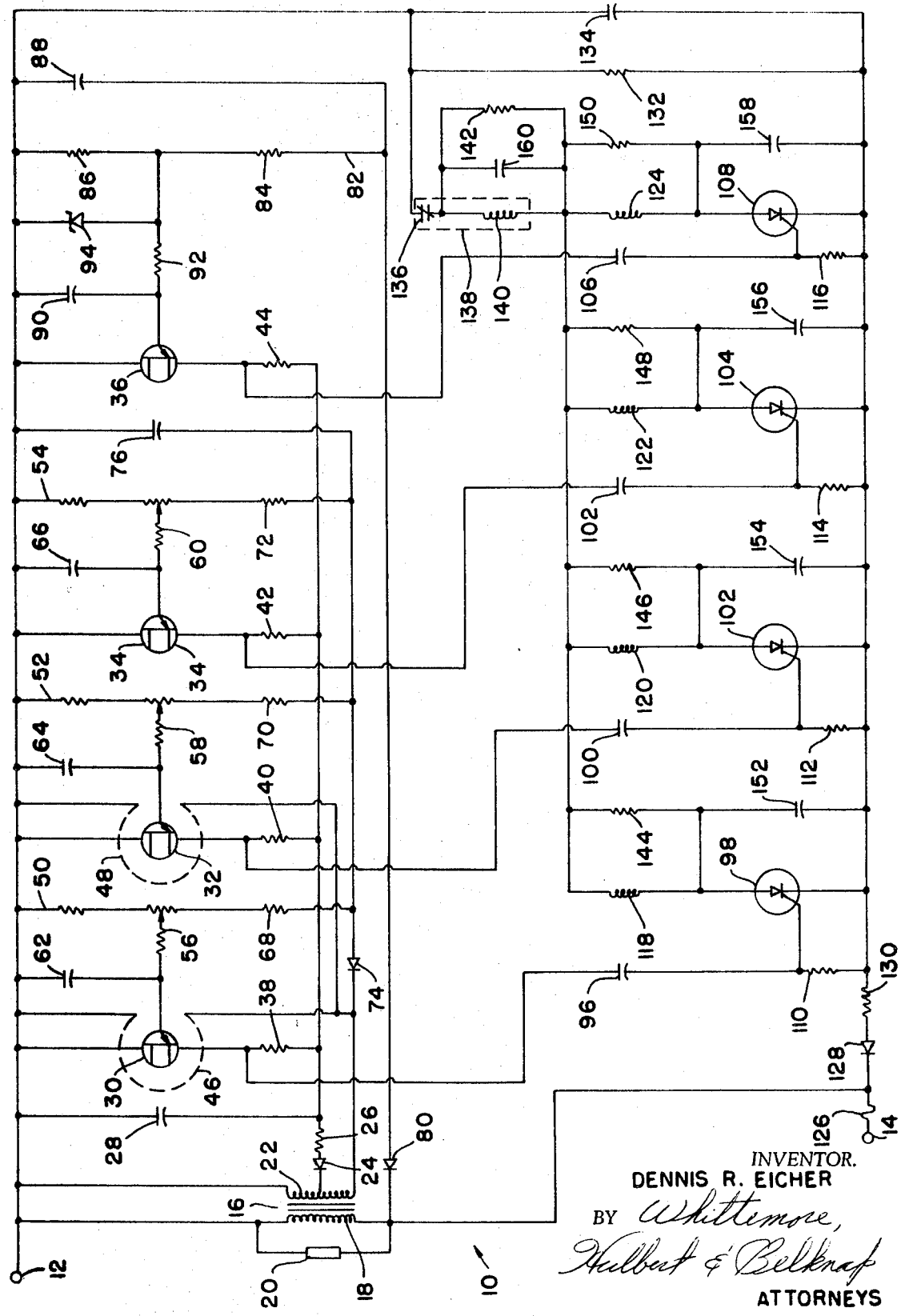

STRUCTURE FOR AND METHOD OF VOLTAGE DIP COUNTING

BACKGROUND OF THE INVENTION

1. Field of the Invention

The invention relates to monitoring electrical circuits and refers more specifically to structure for and a method of counting the number of single cycles of an alternating electrical signal having a voltage dip of a plurality of separate magnitudes.

2. Description of the Prior Art

In the past, a plurality of control circuits responsive to voltage variations in a monitored circuit have been known. No solid-state circuits are, however, known for counting the voltage dips of single cycles of alternating electrical energy. Similarly, no known circuits are provided for counting the number of single cycle voltage dips of an alternating electrical signal of a plurality of predetermined magnitudes.

SUMMARY OF THE INVENTION

In accordance with the invention, there is provided structure for and a method of voltage dip counting including means for providing a reference voltage, means for comparing separate cycles of an alternating electrical signal with the reference voltage and counting the number of single cycles of the alternating signal, the voltage of which dips a predetermined percentage from a norm for a plurality of separate percentage voltage dips. Temperature compensation for the voltage comparison means is provided in accordance with the invention.

BRIEF DESCRIPTION OF THE DRAWING

The Figure is a schematic diagram of voltage dip counter structure constructed in accordance with the invention for effecting the method of voltage dip counting in accordance with the invention.

DESCRIPTION OF THE PREFERRED EMBODIMENT

The voltage dip counter circuit 10 is connected to receive an alternating electrical signal over the terminals 12 and 14. The circuit 10 is operable to count the number of single cycles of the alternating electrical signal connected across terminals 12 and 14 which dip 10 percent, 25 percent, 50 percent and 100 percent from the normal value thereof. The circuit 10 will not count gradual variations in the alternating electrical signal at the terminals 12 and 14.

In accordance with the invention, a reference voltage which is substantially the root mean square of the peak voltages of the input electrical signal is produced from the alternating electric signal impressed across transformer 16 having the primary winding 18 and the secondary winding 22. Thyreactor 20 protects circuit 10 from over-voltages at terminals 12 and 14. The reference voltage is provided across the diode 24, resistor 26 and filter capacitor 28. The reference voltage is then placed across the unijunction transistors 30, 32, 34 and 36 through load resistors 38, 40, 42 and 44, respectively.

The unijunction transistors 30 and 32 are temperature compensated by oven means 46 and 48 connected across the transformer secondary winding 22 in parallel. The ovens 46 and 48 include thermostatically controlled heating elements and are purchased items which will not, therefore, be considered in detail.

Single-cycle voltages are produced across the voltage dividers 50, 52 and 54 for the unijunction transistors 30, 32 and 34, respectively. The potentiometer portions 56, 58 and 60 of the voltage dividers 50, 52 and 54 connect a variable voltage from the voltage dividers to the respective control electrodes of the unijunction transistors 30, 32 and 34.

Capacitors 62, 64 and 66 are selected to be of a size to maintain a voltage on the control electrode of the respective unijunction transistor to maintain the unijunction transistor in an off condition as long as the single-cycle voltage through divider 50 does not dip more than 10 percent, through the voltage divider 52 does not dip more than 25 percent, and through the voltage divider 54 does not dip more than 50 percent.

The resistances 68, 70 and 72 are different and along with the variable resistances 56, 58 and 60 permit conduction of the unijunction transistors 30, 32 and 34 in response to single-cycle voltage dips of 10, 25 and 50 percent from the voltage of the input signal, respectively, when compared with the reference voltage applied to the unijunction transistors. With no or an insufficient dip in the single-cycle voltage at a particular unijunction transistor, the capacitor 62, capacitor 64 or capacitor 66 in conjunction with the single-cycle signals across the voltage dividers 50, 52 and 54 maintain the unijunction transistors in a nonconducting condition.

Diode 74 in conjunction with the capacitor 76 provides sawtooth single-cycle voltages across the voltage dividers 50, 52 and 54 from the secondary winding 22 of the transformer 16.

A single-cycle sawtooth voltage is provided on the control electrode of the unijunction transistor 36 through the diode 80 across the voltage divider 82 including the resistors 84 and 86 connected across the primary winding 18 of the transformer 16 in conjunction with the capacitor 88.

The voltage applied to the capacitor 90 for each single cycle of the alternating input signal through the resistor 92 and across the resistor 86 is regulated in magnitude by the Zener diode 94.

Again, the voltage on the capacitor 90 is sufficient to keep the unijunction transistor 36 in a nonconducting condition providing the single pulse of alternating electrical energy does not dip 100 percent. In other words, providing no single pulses of the alternating electrical energy are missing, the unijunction transistor 36 will not conduct.

Should a single cycle of the alternating electrical energy across the transformer 16 dip 10 percent, the unijunction transistor 30 will conduct to provide an output across the resistor 38 through coupling capacitor 96 to the control electrode of the silicon-controlled rectifier 98. Should the single cycle signal dip 25 percent, the unijunction transistor 32 will also be allowed to conduct and provide an output signal across the resistor 40 through the capacitor 100 to the silicon-controlled rectifier 102. Similarly, a third output signal will be provided across the resistor 42 and capacitor 102 to the silicon-controlled rectifier 104 should the single-cycle signal drop 50 percent, and a fourth output signal will be provided across the resistor 44 through capacitor 106 to the silicon-controlled rectifier 108 if the single-cycle signal dips 100 percent.

The resistors 110, 112, 114 and 116 are provided to stabilize the circuit through the capacitors 96, 100, 102 and 106 to the control electrodes of the silicon-controlled rectifiers 98, 102, 104 and 108.

A power supply for the operation of the silicon-controlled rectifiers 98, 102, 104 and 108 and the counters 118, 120, 122 and 124 is provided through the terminal 14, fuse 126, diode 128, resistor 130, resistor 132 and filter capacitor 134 to terminal 12. The power supply voltage across resistor 132 and filtered by the capacitor 134 is passed through the normally closed contacts 136 of relay 138 having coil 140 and through resistance 142 and latching resistors 144, 146, 148 and 150 across the silicon-controlled rectifiers 98, 102, 104 and 108 in parallel with the voltage surge protection capacitors 152, 154, 156 and 158, respectively. Counters 118, 120, 122 and 124 are connected in series with the silicon-controlled rectifiers 98, 102, 104 and 108, as shown.

On receiving a pulsed signal from unijunction transistor 30, 32, 34 or 36, the respective silicon controlled rectifiers 98, 102, 104 or 108 will conduct and draw current through the counters 118, 120, 122 or 124 to register one count for a single-cycle pulse, the voltage of which dips below the predetermined voltage dip percentage fixed in relation to the reference voltage on the unijunction transistors 30, 32, 34 and 36, respectively. One or all of the silicon-controlled rectifiers will conduct to provide in the associated counter a permanent record of the voltage dip characteristics of the alternating signal at terminals 12 and 14.

During conducting of any of the silicon-controlled rectifiers 98, 102, 104 and 108, current is drawn through the relay contacts 136 and through the resistor 142. During this time the condenser 160 is charged and little current flows through the relay coil 140. After charging of the condenser 160, more current passes through the relay coil 140 until the relay is sufficiently energized to open contacts 136.

On opening of the relay contacts 136, the electrical energy to the silicon-controlled rectifiers 98, 102, 104 and 108 is cut off so that the rectifiers are rendered nonconducting. Thus, it will be seen that for each pulse of electrical energy from one of the unijunction transistors 30, 32, 34 or 36, one of the silicon-controlled rectifiers 98, 102, 104 and 108 will conduct for a short period sufficient to actuate the associated counters 118, 120, 122 or 124 and will subsequently be rendered nonconductive. Such action takes place within the time of a single cycle of, for example, 60-cycle-per-second alternating electrical energy.

In overall operation, an alternating electrical signal is applied to the circuit 10 at the terminals 12 and 14. A reference voltage is developed across the secondary winding 22 of the transformer 16 through the diode 24 and resistor 26 which is filtered by the capacitor 28 so that it has a voltage varying with the general level of the alternating electrical signal input and is of approximately the root mean square value thereof. The reference signal is applied across the unijunction transistors 30, 32 34 and 36.

Single-cycle signals are developed across the secondary winding 22 of the transformer 16 for each cycle of the alternating electrical signal input to the circuit 10 across the diode 74 and the voltage dividers 50, 52 and 54 in conjunction with capacitor 76 for application to the unijunction transistors 30, 32 and 34. Single-cycle signals are also developed across the diode 80 and voltage divider 82 in conjunction with capacitor 88 for application to the unijunction transistor 36.

The voltage dividers 50, 52, 54 and 82 and capacitors 62, 64, 66 and 90 are proportioned so that with the general signal level of the input alternating electrical signal for any single-cycle signal, the unijunction transistors are maintained in a nonconducting condition as a result of the root mean square reference voltage applied thereacross and the single-cycle signals applied to the control electrodes thereof.

Should a single-cycle signal dip in voltage 10 percent, the signal on the control electrode of the unijunction transistor 30 will be insufficient to maintain the unijunction transistor 30 in an off condition. It will conduct and an output signal will be provided across the resistor 38 and through the capacitor 96 to the control electrode of the silicon controlled rectifier 98.

If the voltage of the single-cycle signal dips 25 percent, the unijunction transistor 32 as well as the unijunction transistor 30 will be caused to conduct to provide a signal to the control electrode of the silicon-controlled rectifier 102 as well as to the control electrode of the silicon-controlled rectifier 98.

Similarly, if the single-cycle voltage dips 50 percent and 100 percent, the unijunction transistors 34 and 36 will be caused to conduct respectively along with the unijunction transistors 30 and 32 to provide an output signal to the control electrode of the silicon-controlled rectifiers 104 and 108.

Each time an output signal is received at the control electrode of the silicon-controlled rectifiers 98, 102, 104, or 108, the silicon-controlled rectifier having the output signal on the control electrode thereof will conduct and the associated counter 118, 120, 122 or 124 will be energized to provide a count for the single cycle.

When the current passing through relay 138 on conduction of any or all of the silicon-controlled rectifiers 98, 102, 104 or 108 becomes great enough, the relay 138 is actuated to open the contacts 136 and deenergize the silicon-controlled rectifiers to prepare them for a subsequent cycle of the alternating signal at terminals 12 and 14.

The end result of the voltage dip counter circuit 10 is then a count of the total number of single-cycle voltage dips of an input electrical signal which are greater than 10 percent, greater than 25 percent, greater than 50 percent and 100 percent. Single-cycle voltage dips wherein the cycle lasts only 16 microseconds have been successfully counted with the voltage dip counter circuit 10.

What I claim as my invention is:

1. A voltage dip counter comprising a source of alternating electrical energy, means connected to the source of alternating energy for providing a reference voltage of the average voltage representative of the source of alternating electrical energy, means connected to the source of alternating energy for providing a separate voltage for each single cycle of the alternating energy equal to the voltage of the alternating energy during the particular cycle of the alternating energy, means connected to the reference voltage providing means and to the means for providing the separate voltage for each cycle of the alternating energy for comparing the reference voltage and single-cycle voltage and providing an output signal when the single-cycle voltage signal is less than a predetermined percent of the reference voltage signal, means for temperature-compensating the means for comparing the reference voltage and the single-cycle voltage and means connected to receive the output signal for counting the output signals.

2. Structure as set forth in claim 1 and further including a plurality of the means for providing single-cycle voltages and a plurality of means for comparing the reference voltage and each of the single-cycle voltages for producing separate output signals for single-cycle voltages varying in different percentages from the reference voltage and a plurality of means connected to the plurality of means for comparing the single-cycle voltages and the reference voltage for counting the output signals of each of the comparing means.

3. Structure as set forth in claim 1 wherein the means for comparing the reference voltage and the single-cycle voltage comprises a unijunction transistor having a control electrode connected to the single-cycle voltage.

4. Structure as set forth in claim 1 wherein the means for counting the output signals comprises a silicon-controlled rectifier connected in series with a counter and including a control electrode connected to receive the output signals from the means for comparing the reference voltage and the single-cycle voltage.

5. Structure as set forth in claim 4 and further including relay means for cutting off the means for counting the output signals.

6. The method of counting single-cycle voltage dips in an alternating electrical energy source comprising providing a reference voltage signal, comparing the reference voltage signal with the single-cycle voltage signal of the alternating electrical energy source, providing an output signal in response to the compared reference signal and single-cycle signal having a predetermined difference indicating a predetermined percent dip in the single-cycle signal, temperature-compensating the comparison between the reference signal and single cycle signal and counting the number of output signals.

7. The method as set forth in claim 6 and further including comparing a plurality of the single-cycle signals with the reference signal and providing an output signal in accordance with the particular percentage dip of the single-cycle signals and recording each of the output signals separately corresponding to each particular percentage dip.

* * * * *